US006338051B1

(12) United States Patent
Kang et al.

(10) Patent No.: US 6,338,051 B1
(45) Date of Patent: Jan. 8, 2002

(54) USER PREFERENCE MODELING METHOD USING FUZZY NETWORKS

(75) Inventors: Ho-seok Kang; Sun-wha Chung; Kwang-hyung Lee, all of Seoul; Joo-young Yoon, Taejun; Kyoung-a Sung, Seoul, all of (KR)

(73) Assignees: Samsung Electronics Co., Ltd., Kyungki-Do; Korean Advance Institute of Science and Technology, Taejun, both of (KR)

( * ) Notice: Subject to any disclaimer, the term of this patent is extended or adjusted under 35 U.S.C. 154(b) by 0 days.

(21) Appl. No.: 09/301,317

(22) Filed: Apr. 29, 1999

(30) Foreign Application Priority Data

Apr. 30, 1998 (KR) .......................................... 98-15521

(51) Int. Cl.[7] .............................................. G06F 15/18

(52) U.S. Cl. ............................... 706/2; 706/11; 706/12

(58) Field of Search ................................ 706/2, 12, 13, 706/14

(56) References Cited

U.S. PATENT DOCUMENTS

| 5,479,580 A | * | 12/1995 | Kinoshita | 706/12 |
| 5,524,176 A | * | 6/1996 | Narita et al. | 706/2 |
| 5,602,966 A | * | 2/1997 | Kinoshita | 706/14 |

(List continued on next page.)

OTHER PUBLICATIONS

Tiben, A.; "Knowledge bases for user guidance in information seeking dialogues". Proceedings of the International Workshop on Intelligent User Interfaces, Jan. 1993, p. 149–156.*

Takagi, H.; "Application of neural networks and fuzzy logic to consumer products". Proceedings of the 1992 International Conference on Industrial Electronics, Control, Instrumentation, and Automation, Nov. 1992, vol. 3, p. 1629–1633.*

(List continued on next page.)

*Primary Examiner*—George B. Davis
*Assistant Examiner*—Kelvin Booker
(74) *Attorney, Agent, or Firm*—Sughrue Mion, PLLC

(57) ABSTRACT

A user preference modeling method using fuzzy networks. The user preference modeling method includes the steps of: (a) changing a user modeling structure into a fuzzy network structure in which a plurality of layers including one or more graphs with one or more nodes are stacked; (b) when information is input from a user, searching a node directly associated with the input information on the fuzzy networks, and calculating a new preference for the node with a predetermined equation; (c) calculating connection strengths among each node in a graph to which the node belongs according to the new preference obtained in step (b) and calculating a new preference for each node of the graph according to the connection strengths; (d) when a node of the graph to which the node searched in step (b) belongs is a macro node of a graph of a lower layer, and a node is defined as the macro node if a graph of a lower layer defines sub-regions of the node, transferring a first message as preference change information from the macro node to the graph of the lower layer; (e) when the graph to which the node searched in step (b) belongs has a macro node in an upper layer, transferring a second message to the macro node, as preference change information for all nodes of the graph to which the node belongs; (f) when a graph receives the first message from a macro node, calculating a new preference for all nodes in the graph that has received the first message, and when a node of the graph that has received the first message is a macro node of a graph of a lower layer, transferring a first message as preference change information to the graph of the lower layer; and (g) when a node receives the second message from a graph of a lower layer, calculating a new preference for the node that has received the second message and performing steps (c) through (e) to other nodes.

14 Claims, 9 Drawing Sheets

U.S. PATENT DOCUMENTS

| | | | | | |
|---|---|---|---|---|---|
| 5,608,846 | A | * | 3/1997 | Mitsubuchi et al. | 706/59 |
| 5,664,068 | A | * | 9/1997 | Huang et al. | 706/27 |
| 5,740,322 | A | * | 4/1998 | Inoue | 706/2 |
| 5,754,738 | A | * | 5/1998 | Saucedo et al. | 706/11 |
| 5,761,384 | A | * | 6/1998 | Inoue | 706/2 |
| 5,819,242 | A | * | 10/1998 | Maksuoka et al. | 706/2 |
| 5,822,495 | A | * | 10/1998 | Wang et al. | 706/2 |
| 5,970,482 | A | * | 10/1999 | Pham et al. | 706/12 |
| RE36,823 | E | * | 8/2000 | Takagi et al. | 706/2 |
| 6,192,351 | B1 | * | 2/2001 | Persaud | 706/2 |

OTHER PUBLICATIONS

Geiger et al.; "Using ConFuP in modeling of concurrent fuzzy systems". Proceedings of the third IEEE conference on fuzzy systems, Jun. 1994, vol. 2, p. 1093–1098.*

Palade et al.; "A method for compiling neural networks into fuzzy rules using genetic algorithms and hierarchical approach". 1998 Second International Conference on Knowledge–Based Intelligent Electronic Systems, Apr. 1998, vol., 2, p. 353–358.*

Matsushita et al.; "Efficient fuzzy modeling and evaluation criteria". Proceedings of the 1997 First International Conference on Knowledge–Based Intelligent Electronic Systems, May 1997, vol. 1, p. 283–288.*

Sun, C.-T.; "An information retrieval model for coordination systems based on fuzzy proximity networks". IEEE International Conference on Systems, Man and Cybernetics, Nov. 1990, p. 418–423.*

* cited by examiner

FIG. 8

```
CLASS : MUSIC

• CLASSICAL :    (0):0.333333 o STRING QUARTET :   (0): 0.333333 o ORCHESTRA :    (0): 0.266667 o CONCERTO, CHAMBER MUSIC :    (0): 0.266667 o CELLO SOLO :   (0): 0.200000 o SYMPHONY :    (0): 0.200000

• KOREAN POP :   (0): 0.333333 o ADULT CONTEMPORARY : SOFT ROCK & BALLAD :
                  (0): 0.266667

• BY JaeHa You :   (0): 0.266667

• BY SeungHwan Lee :   (0): 0.266667

• BY SoLa Lee :    (0): 0.266667

• WESTERN POP :  (0): 0.266667 o ADULT CONTEMPORARY : SOFT ROCK & BALLAD &
      ROCK BALLAD :     (0): 0.266667

• Michael Jackson :   (0): 0.266667 o R&B :   (0): 0.266667
```

FIG. 9

CLASS : MUSIC

- <u>CLASSICAL</u> :    (5):0.408333
    - <u>STRING QUARTET</u> :    (0): 0.321113
    - <u>ORCHESTRA</u> :    (2): 0.304447
    - <u>CONCERTO, CHAMBER MUSIC</u> :    (0): 0.254447
    - <u>SYMPHONY</u> :    (3): 0.242780
    - <u>VIOLIN SOLO</u> :    (0): 0.107780
- <u>KOREAN POP</u> :    (5): 0.408333
    - <u>ADULT CONTEMPORARY : SOFT ROCK & BALLAD</u> :    (5): 0.318942
        - <u>BY SoLa Lee</u> :    (1): 0.296892
        - <u>BY JaeHa You</u> :    (0): 0.251892
        - <u>BY SeungHwan Lee</u> :    (0): 0.251892
- <u>WESTERN POP</u> :    (0): 0.276667
    - <u>ADULT CONTEMPORARY : SOFT ROCK & BALLAD & ROCK BALLAD</u> :    (0): 0.231667
        - <u>Michael Jackson</u> :    (0): 0.227117
    - <u>R&B</u> :    (0): 0.231667

CLASS : MUSIC
- KOREAN POP :   (36): 0.313333
  o ADULT CONTEMPORARY : SOFT ROCK & BALLAD :
                                      (0): 0.627587
    - BY SoLa Lee :   (5): 0.423747
    - BY TaeChun Jung & EunOk Park : (16): 0.318747
    - BY HeeEun Yang :   (11): 0.293747
    - BY TRAVELING SKETCH :  (2): 0.222080
    - BY SeungHwan Lee :   (0): 0.198747
    - BY JaeHa You :   (0): 0.198747
  o JAZZ  (2): 0.174253
- CLASSICAL :   (21): 0.738333
  o ORCHESTRA :  (6): 0.383351
  o SYMPHONY :  (10): 0.336684
  o CONCERTO, CHAMBER MUSIC :   (3): 0.288351
  o STRING QUARTET :  (0): 0.220017
- WESTERN POP :  (3): 0.421667

USER PREFERENCE MODELING METHOD USING FUZZY NETWORKS

BACKGROUND OF THE INVENTION

1. Field of the Invention

The present invention relates to a method of modeling user preference, and more particularly, to a user preference modeling method using fuzzy networks.

2. Description of the Related Art

New trends in software are geared toward how to efficiently serve specific information a user wants to access. To this end, user preference must be individualized and it is important to cope with such user preference. That is, a computer system acquires user information through communications with the user and infers to get more information, thereby providing good information which reflects the user's taste.

The type of information stored in a computer for this purpose is called a "user model" and the processes for acquiring information from the user and inferring more information therefrom are called "user modeling".

The problem in grasping the users taste always implies some degree of uncertainty because inferring on the user's taste using a computer cannot ensure 100% certainty. Thus, user modeling capable of exposing such inevitable uncertainty and solving the problem of uncertainty is required.

For user modeling, the Bayesian network method, the Dempster-Shafer evidence theory and a method based on the fuzzy theory have been introduced.

Firstly, the Bayesian network method is based on the Bayesian probability theory and is expressed as a graph illustrating the relationship between each parameter extracted to model the user preference. Then, probability values of each parameter are corrected using information input from the outside, and the overall user preference is inferred using the inference algorithm based on the relationship among each parameter.

Secondly, the Dempster-Shafer evidence theory expresses the uncertainty as a concept of interval as opposed to the probability theory which adopts a figure to express the uncertainty. Also, the degree of effect of the information provided from the outside on each individual taste of the user is calculated and then generalized to grasp the overall user preference.

Thirdly, the method based on the fuzzy theory applies all expression and inferring activities occurring in daily life to a computer, which is very useful in managing uncertainty in user modeling.

The above methods have been used to model knowledge, goals, experience and background of the user. However, user preference rather than other information is easily changeable, so it is difficult to generalize all information required for the user modeling. Thus, there is a problem in modeling the user preference using the conventional methods.

SUMMARY OF THE INVENTION

It is an object of the present invention to provide a user preference modeling method using fuzzy networks, capable of easily modeling a user preference.

It is another object of the present invention to provide a method of serving an adaptive web directory using fuzzy networks, capable of restructuring a web directory structure according to the user preference using a user preference modeling method based on the fuzzy networks.

It is still another object of the present invention to provide a computer readable medium storing a computer program for the user preference modeling using fuzzy networks.

To achieve the first object of the present invention, there is provided a user preference modeling method using fuzzy networks, comprising the steps of: (a) changing a user modeling structure into a fuzzy network structure in which a plurality of layers including one or more graphs with one or more nodes, are stacked; (b) when information is input from a user, searching a node directly associated with the input information on the fuzzy networks, and calculating a new preference for the node with a predetermined equation; (c) calculating connection strengths among each node in a graph to which the node belongs according to the new preference obtained in step (b) and calculating a new preference for each node of the graph according to the connection strengths; (d) when the node of the graph to which the node searched in step (b) belongs is a macro node of a graph of a lower layer, and a node is defined as the macro node if a graph of a lower layer defines sub-regions of the node, transferring a first message as preference change information from the macro node to the graph of the lower layer; (e) when the graph to which the node searched in step (b) belongs has a macro node in an upper layer, transferring a second message to the macro node, as preference change information for all nodes of the graph to which the node belongs; (f) when a graph receives the first message from a macro node, calculating a new preference for all nodes in the graph that has received the first message, and when a node of the graph that has received the first message is a macro node of a graph of a lower layer, transferring a first message as preference change information to the graph of the lower layer; and (g) when a node receives the second message from a graph of a lower layer, calculating a new preference for the node that has received the second message and performing step (c) through (e) to other nodes.

To achieve the second object of the present invention, there is provided a method of serving an adaptive web directory using fuzzy networks, comprising the steps of: (a) changing a web directory structure on a web server into a fuzzy network structure in which a plurality of layers including one or more graphs with one or more nodes, are stacked; (b) when information is input by a user, searching a node on the fuzzy networks, the node being directly associated with the input information, and calculating a new preference for the node; (c) calculating connection strengths for all nodes of a graph to which the node searched in step (b) belongs, based on the new preference obtained in step (b), and calculating new preferences for each node of the graph in consideration of the connection strengths; (d) when a node of the graph to which the node searched in step (b) belongs is a macro node of a graph of a lower layer, and a node is defined as the macro node if a graph of a lower layer defines sub-regions of the node, transferring a first message as preference change information from the macro node to the graph of the lower layer; (e) when the graph to which the node searched in step (b) belongs has a macro node in an upper layer, transferring a second message to the macro node, as change information for all nodes of the graph to which the node belongs; (f) when a graph receives the first message from a macro node, calculating a new preference for all nodes in the graph that has received the first message, and when a node of the graph that has received the first message is a macro node of a graph of a lower layer, transferring a first message as preference change information to the graph of the lower layer; (g) when a node receives the second message from a graph of a lower layer, calculating a new preference for the node that has received the second message and performing step (c) through (a) to other nodes: and (h) restructuring the web directory according to the user preference to provide a web directory structure adaptable to the user preference characteristic.

The invention may be embodied in a general purpose digital computer that is running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). Hence, the present invention may be embodied as a computer usable medium.

According to still another object of the present invention, there is provided a computer readable medium storing a computer program for the user preference modeling method using fuzzy networks, wherein the user preference modeling comprises the steps of: (a) changing a user modeling structure into a fuzzy network structure in which a plurality of layers including one or more graphs with one or more nodes, are stacked; (b) when information is input from a user, searching a node directly associated with the input information on the fuzzy networks, and calculating a new preference for the node with a predetermined equation; (c) calculating connection strengths among each node in a graph to which the node belongs according to the new preference obtained in step (b) and calculating a new preference for each node of the graph according to the connection strengths; (d) when the node of the graph to which the node searched in step (b) belongs is a macro node of a graph of a lower layer, and a node is defined as the macro node if a graph of a lower layer defines sub-regions of the node, transferring a first message as preference change information from the macro node to the graph of the lower layer; (e) when the graph to which the node searched in step (b) belongs has a macro node in an upper layer, transferring a second message to the macro node, as change information for all nodes of the graph to which the node belongs; (f) when a graph receives the first message from a macro node, calculating a new preference for all nodes in the graph that has received the first message, and when the node of the graph that has received the first message is a macro node of a graph of a lower layer, transferring a first message as preference change information to the graph of the lower layer; and (g) when a node receives the second message from a graph of a lower layer, calculating a new preference for the node that has received the second message and performing step (c) through (e) to other nodes.

BRIEF DESCRIPTION OF THE DRAWINGS

The above objects and advantages of the present invention will become more apparent by describing in detail preferred embodiments thereof with reference to the attached drawings in which:

FIG. 8 shows an initial structure of a user's web directory;

FIG. 9 shows the directory structure changed after the user listens to 10 songs;

DESCRIPTION OF PREFERRED EMBODIMENTS

In a user preference modeling method according to the present invention, a new methodology for expressing the user preference, fuzzy networks, is used. Also, the overall user preference is inferred according to a new inference algorithm based on the fuzzy theory, using information provided from the outside.

Figure 1:
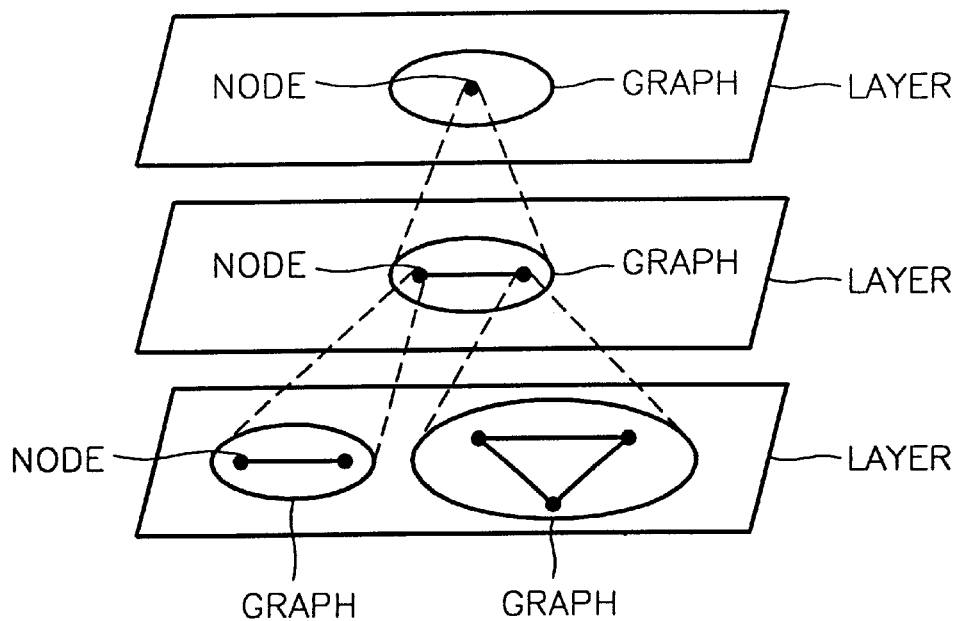
FIG. 1 shows the structure of fuzzy networks.

The structure of the fuzzy network roughly includes a layer structure and a graph structure as shown in FIG. 1. Each layer has a 2-dimensional structure consisting of a set of fuzzy graphs.

Figure 2:
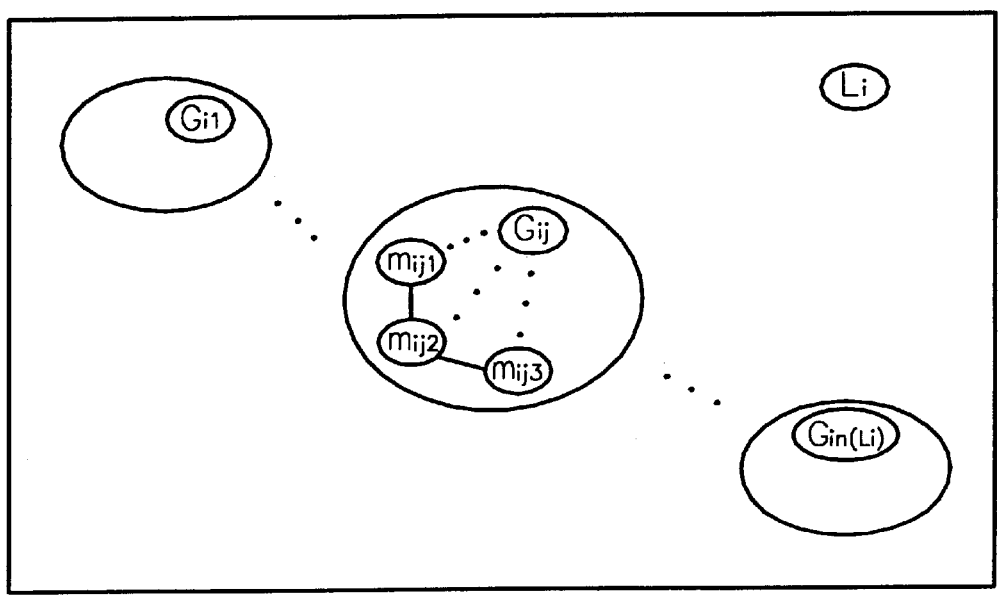
FIG. 2 shows a detailed structure of each layer in the fuzzy networks shown in FIG. 2.

The fuzzy networks have one or more layers. To understand the layered structure, it is assumed that $L_i$ represents the ith layer, $n(L_i)$ represents the total number of graphs in the ith layer, $G_{ij}$ represents the jth fuzzy graph of the ith layer, where j=1, 2, ... and $n(L_i)$, $n(G_{ij})$ represents the total number of nodes in the graph $G_{ij}$, $M_{ij}$ represents the jth modeling region of the ith layer, where j=1, 2, ... and $n(L_i)$, and $m_{ijk}$ represents the kth sub-region of the modeling region $M_{ij}$, where k=1, 2, ... and $n(G_{ij})$. Each layer $L_i$ of the fuzzy networks has as many modeling regions as $n(L_i)$, and each modeling region $M_{ij}$ has sub-region $m_{ijk}$ (k=1, 2, ..., $n(G_{ij})$. Here, the sub-region $m_{ijk}$ of the modeling region $M_{ij}$ is called a node, and the nodes form a graph with lines connecting each node. That is, each modeling region $M_{ij}$ is expressed by one graph $G_{ij}$, as shown in FIG. 2.

Figure 3:
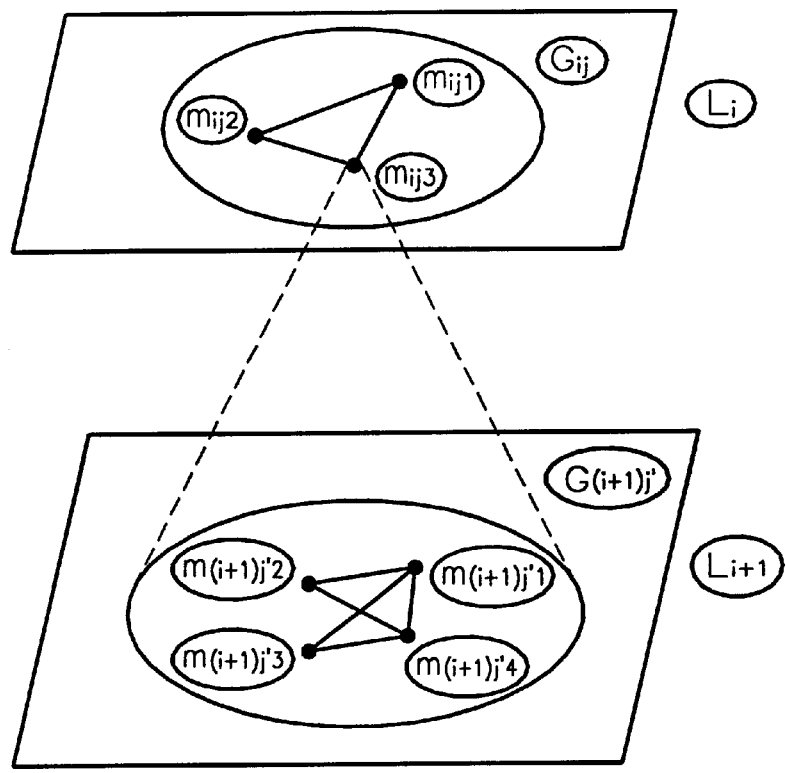
FIG. 3 is a diagram illustrating the generation of a lower layer.

The fuzzy networks have a hierarchy structure in which the above layers are stacked. Here, the layers from the ith layer $L_i$ to (l+1)th layer $L_{i+1}$ are formed in FIG. 3.

In order to further analyze the sub-region corresponding to the node $m_{ijk}$ of the modeling region $M_{ij}$ of the ith layer $L_i$, the node $m_{ijk}$ can be extended to a new modeling region $M_{(i+1)j'}$ of a lower layer $L_{i+1}$. Here, the node $m_{ijk}$ before the extension is defined as a macro node to the new modeling region $M_{(i+1)j'}$ of the layer $L_{i+1}$. Considering the physical aspects, each node of the modeling region $M_{(i+1)j'}$ represents sub-regions of the macro node $m_{ijk}$.

Figure 4:
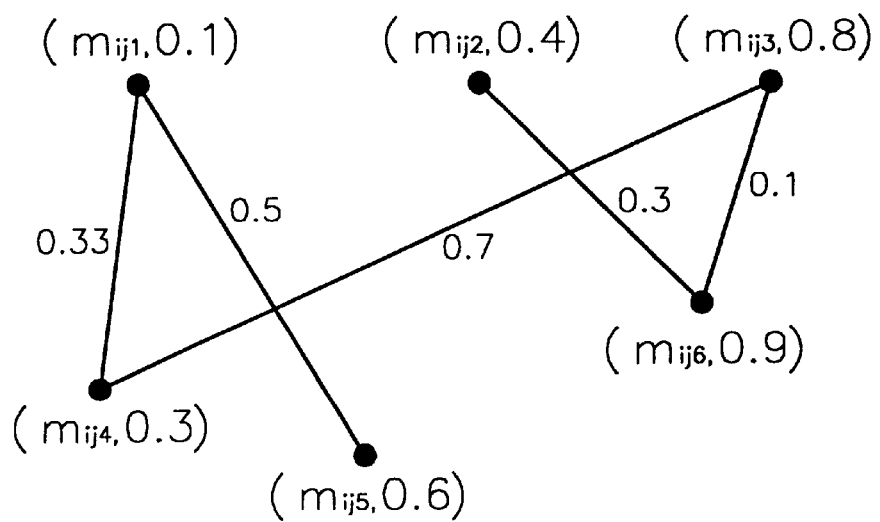
FIG. 4 shows an example of a fuzzy graph.

Also, the modeling region $M_{ij}$ of the layer $L_i$ is expressed by one graph $G_{ij}$, and each node of the graph $G_{ij}$ is expressed as a fuzzy value between 0 and 1, which is the user preference for the corresponding modeling region and the connection relation between each node. Actually, the fuzzy value of the connection relation represents the connection strength between two modeling regions and is expressed as $W(m_{ijk}, m_{ijk'})$. Here, the connection strength between the modeling regions is dynamically set as the user uses the system. An example of the graph $G_{ij}$ is shown in FIG. 4, and the user modeling region can be changed into the network structure.

Figure 5:
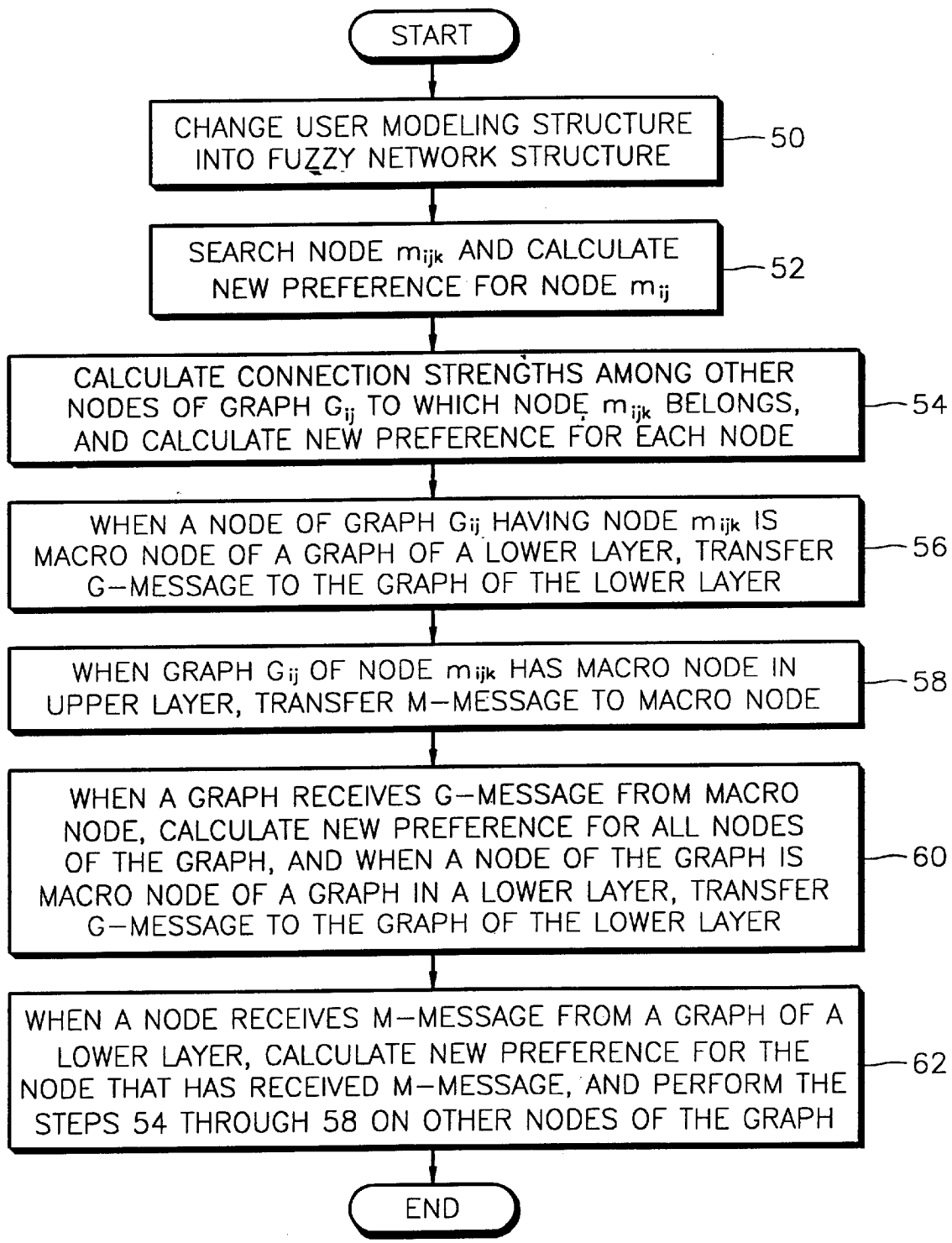
FIG. 5 is a flowchart illustrating a user preference modeling method using fuzzy networks according to a preferred embodiment of the present invention.

FIG. 5 is a flowchart illustrating a user preference modeling method using fuzzy networks according to an embodiment of the present invention.

Information provided from the outside includes information about the user preference for the modeling region indicated by an arbitrary node. The information changes the user preference for the node, and influences the preference for other nodes by the fuzzy connection relation defined in each fuzzy graph. As the preference for each node is continuously corrected, the connection strength in the graph is dynamically adjusted.

Assuming that the user preference for an arbitrary node $m_{ijk}$ is $F(m_{ijk})$, a G-message which is a preference change information and an M-message which is a node change information are defined as follows. That is, the G-message is referred to as a message sent when the user preference $F(m_{ijk})$ for the node $m_{ijk}$ is changed and there is a graph $G_{(i+1)j'}$ of the lower layer having the node $m_{ijk}$ as a macro node, which the node $m_{ijk}$ sent to the graph $G_{(i+1)j'}$ of the lower layer, so as to calculate the influence on the nodes belonging to the graph $G_{(i+1)j'}$. Here, the G-message is expressed as $G_{msg}(M_{ijk}, G_{(i+1)j'})$. Also, when the preference $F(m_{ijk})$ for the node $m_{ijk}$ is changed and there is a macro node $m_{(i-1)j'k'}$ to the graph $G_{ij}$ which the node $m_{ijk}$ belongs to, the graph $G_{ij}$ sends the M-message to the macro node $m_{(i-1)j'k'}$, wherein the M-message is expressed as $M_{msg}(G_{ij}, m_{(i-1)j'k'})$.

Hereinafter, the user preference modeling method using the fuzzy networks according to an embodiment of the present invention, illustrated in FIG. 5, will be described in detail.

Referring to FIG. 5, in step 50 the modeling structure of a user is changed into a fuzzy network structure to construct fuzzy networks. In step 52, when information is input from the user, a node $m_{ijk}$ directly associated with the input information is searched and a new preference for the node $m_{ijk}$ is calculated by a predetermined equation.

In step 54, the connection strengths among each node in the graph $G_{ij}$ which the node $m_{ijk}$ belongs to are calculated according to the new preference obtained in step 52, and a new preference for each node $m_{ijk'}$ in the graph $G_{ij}$ is calculated based on the connection relation with the node $m_{ijk}$. In step 56, when a node in the graph $G_{ij}$ to which the node $m_{ijk}$ belongs is the macro node for a graph $G_{(i+1)j'}$ in the lower layer, a G-message is sent to the graph $G_{(i+1)j'}$ of the lower layer.

In step 58, when a macro node $m_{(i-1)j'k'}$ for the graph $G_{ij}$ to which the node $m_{ijk}$ belongs exists in the upper layer, an M-message which has change information of all nodes is sent to the macro node $m_{(i-1)j'k'}$.

In step 60, when a graph $G_{ij}$ receives a G-message from a macro node, a new preference for all nodes in the graph $G_{ij}$ is calculated, and when a node of the graph $G_{ij}$ is the macro node of a graph $G_{(i+1)j'}$ of the lower layer, a G-message is sent to the graph $G_{(i+1)j'}$ of the lower layer.

In step 62, when a node receives an M-message from the graph $G_{(i+1)j'}$ of the lower layer, a new preference for the node is calculated and the steps 54 through 58 are repeated on other nodes based on the new preference.

Here, the steps 54 through 58 are called IntraGraph propagation, the step 60 is called InterToGraph propagation, and the step 62 is called InterToMacro propagation.

In detail, the IntraGraph propagation is the step for inferring new preference for other nodes in the graph which the node belongs to when the value of a node is changed.

When a preference $F(m_{ijk})$ for a node $m_{ijk}$ is changed, the difference in the preference before and after an inference can be expressed as $$\text{Diff}(m_{ijk}) = F'(m_{ijk}) - F(m_{ijk}) \quad (1)$$

where $F'(m_{ijk})$ represents the new preference after the inference and $F(m_{ijk})$ represents the preference before the inference. It is assumed that other nodes in the graph $G_{ij}$ to which the node $m_{ijk}$ belongs, are $m_{ijk'}$, and the connection strength $W(m_{ijk}, m_{ijk'})$ between the node $m_{ijk}$ and the node $m_{ijk'}$ can be calculated from the new preference by an equation given by $$W(m_{ijk}, m_{ijk'}) = \alpha \cdot \text{Min}\left\{\frac{F(m_{ijk'})}{F'(m_{ijk})}, \frac{F'(m_{ijk})}{F(m_{ijk'})}\right\} \quad (2)$$

where $\alpha$ is an experimental constant that is used to restrict the maximum connection strength among each node. It is understood that the connection strengths among nodes increase as the preference for each node becomes similar. The new preference $F'(m_{ijk'})$ for the nodes $m_{ijk'}$ can be calculated according to the new connection strength by an equation given by $$F'(m_{ijk'}) = \text{Min}\{1.0, F(m_{ijk'}) + W(m_{ijk}, m_{ijk'}) \cdot \text{Diff}(m_{ijk})\} \quad (3)$$

Here, if each node $m_{ijk'}$ is the macro node of the graph $G_{(i+1)j'}$ of the (l+1)th lower layer, calculating a new preference for the node $m_{ijk'}$ affects the values of each graph $G_{(i+1)j'}$. Thus, a G-message is sent from the node $m_{ijk'}$ to the graph $G_{(i+1)j'}$. Here, the G-message $G_{msg}(m_{ijk'}, G_{(i+1)j'})$ has information about the difference $\text{Diff}(m_{ijk'})$ in preference for the node $m_{ijk'}$ before and after inference, which is expressed as $$G_{msg}(m_{ijk'}, G_{(i+1)j'}) = \text{Diff}(m_{ijk'}) \quad (4)$$

After the above processes are completed for all node, $m_{ijk'}$, and when the graph $G_{ij}$ to which the node $m_{ijk}$ belongs has the macro node $m_{(i-1)j'k'}$, the graph $G_{ij}$ sends an M-message to the macro node $m_{(i-1)j'k'}$ to calculate the influence on the macro node. Here, the M-message $M_{msg}(G_{ij}, m_{(i-1)j'k'})$ has information about the maximum difference in preference for all nodes belonging to the graph $G_{ij}$, obtained through the inference, which is expressed as $$M_{msg}(G_{ij}, m_{(i-1)j'k'}) = \text{Max}\{\text{Diff}(m_{ijl})\}, l=1, \ldots, n(G_{ij}) \quad (5)$$

The InterGraph propagation corresponds to the inference when a graph receives a G-message from the macro node. When an arbitrary graph $G_{ij}$ receives a G-message $G_{msg}(m_{(i-1)j'k'}, G_{ij})$ from the macro node $m_{(i-1)j'k'}$ of the graph $G_{ij}$, a new preference $F'(m_{ijk})$ for all nodes $m_{ijk}$ belonging to the graph $G_{ij}$ is calculated by an equation given by $$F'(m_{ijk}) = \text{Min}\left\{1.0, F(m_{ijk}) + \frac{1}{n(G_{ij})} \cdot G_{msg}(m_{(i-1)j'k'}, G_{ij})\right\} \quad (6)$$

Also, if each node $m_{ijk}$ is the macro node for the graph $G_{(i+1)j'}$ of the lower layer, a G-message $G_{msg}(m_{ijk}, G_{(i+1)j'})$ is calculated using the difference in preference $\text{Diff}(m_{ijk})$ before and after the inference, and is sent to the graph $G_{(i+1)j'}$ of the lower layer, which is expressed as $$G_{msg}(m_{ijk}, G_{(i+1)j'}) = \text{Diff}(m_{ijk}) \quad (7)$$

The InterMacro propagation corresponds to the inference for the macro node which has received an M-message from the graph of the lower layer.

When an arbitrary macro node $m_{ijk}$ receives an M-message $M_{msg}(G_{(i+1)j'}, m_{ijk})$ from a graph $G_{(i+1)j'}$ of the lower layer, a new preference $F'(m_{ijk})$ for the macro node $m_{ijk}$ is calculated using the M-message by an equation given by $$F'(m_{ijk}) = \text{Min}\{1.0, F(m_{ijk}) + M_{msg}(G_{(i+1)j'}, m_{ijk})\} \tag{8}$$

Also, calculating a new preference for the node $m_{ijk}$ affects other nodes of the graph $G_{ij}$ to which the node $m_{ijk}$ belongs. To calculate the preference for other nodes, the InterGraph propagation corresponding to the steps 54 through 58 is performed for the graph $G_{ij}$.

Hereinafter, a method of adaptively serving a web directory using the user preference modeling method based on the fuzzy networks according to the present invention will be described.

As the amount of information on the Internet and the number of users who require the Internet service increase geometrically, the importance of building up a user-oriented environment, capable of adaptively serving information that satisfies a specific need for a user, has increased to an information provider. To this end, a web directory in which web directories are adaptively sorted according to the user preference will be described.

In the method of adaptively serving a web directory using the fuzzy networks, in the first step the web directory structure on a web server is changed into a fuzzy network structure in which a plurality of layers including one or more graphs having one or more nodes are stacked, and in the second step when information is input by a user, the node directly associated with the input information is searched on the fuzzy networks to calculate a new preference for the node is calculated by a predetermined equation.

In the third step, the connection strengths among each node of the graph to which the node belongs are calculated based on the new preference obtained in the second step, and a new preference for each node belonging to the graph is calculated according to the connection strengths. In the fourth step, when an arbitrary node of the graph to which the node belongs is the macro node of a graph of the lower layer, wherein the graph of the lower layer defines sub-regions of the node, a G-message which is a preference change information is sent to the graph of the lower layer.

In the fifth step, when the graph having the node has a macro node in the upper layer, an M-message which is a node change information is sent to the macro node, and in the sixth step when a graph receives a G-message from the macro node, a new preference for all nodes belonging to the graph that receives the G-message is calculated, and when a node of the graph is the macro node for a graph of the lower layer, a G-message is sent to the graph of the lower layer.

In the seventh step, when a node receives an M-message from a graph of the lower layer, a new preference for the node is calculated and the third through fifth steps are performed on other nodes. In the eighth step, the web directory is restructured according to the preference, to adaptively serve a web directory according to user preference. Here, the second through seventh steps are the same as in the preference modeling method using the fuzzy networks.

Hereinafter, the method of adaptively serving a web directory using the fuzzy networks according to a musical preference of a user will be described through the following example.

When a user visits a web site through the Internet and connects to a music file to listen to music, the user preference is analyzed using the user preference modeling method according to the present invention, based on the user activities of connecting to the web site and selecting music. Also, the web directory structure of the web server which has web site is dynamically restructured according to the analyzed user preference, to provide different directory structures to each user, thereby building up a user-oriented directory structure.

Figure 6:
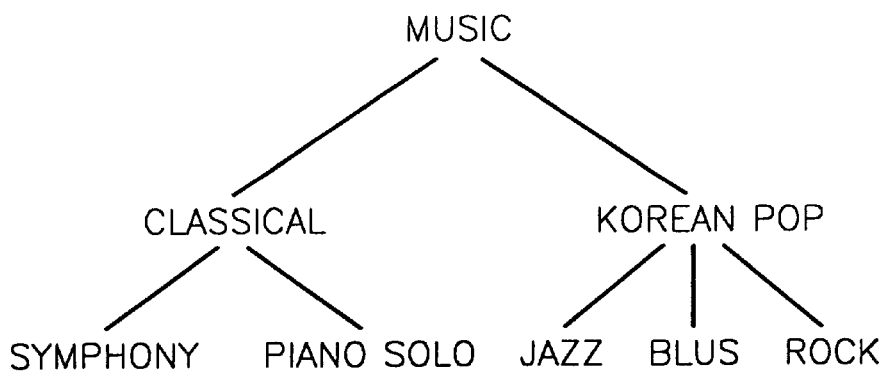
FIG. 6 shows the structure of a web directory.
Figure 7:
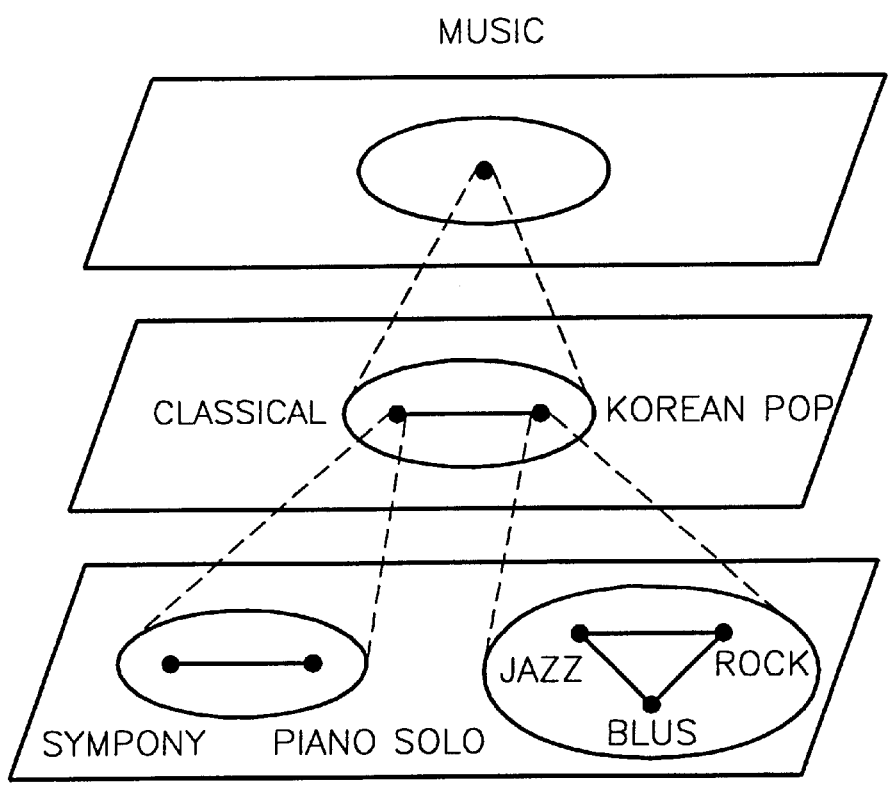
FIG. 7 shows the fuzzy networks changed from the web directory structure shown in FIG. 6.

The directory structure of the web server according to the present invention is as shown in FIG. 6, and the fuzzy network structure changed from the web directory structure consists of three layers as shown in FIG. 7 and nodes of each graph are connected according to the connection strengths.

Visiting a web site by a user corresponds to the user input for the adaptive web directory service. That is, the user activity of selecting and listening to music through the directory structure provided by the web corresponds to the user input. Also, when a user does not listen to a category for a predetermined period, the preference for the category is lowered by aging methodology. A web directory structure adapted to the user is produced using such user input according to the number of listening sessions by the user.

Assuming that a user is a 30-year-old male and the user's favorite music is symphony, orchestra and chamber music in classical music, and songs by HeeEun Yang, by a duo of TaeChun Jung and EunOk Park, and by SoLa Lee in Korean pop, and songs by the Beatles in Western pop, an initial directory structure is set as shown in FIG. 8 according to a predetermined setting of the user.

The applied setting is the most similar type to the user selected from some settings according to the user preference.

Figures in parentheses in FIG. 8 represent the number of listening sessions in the corresponding category, and decimals represent the preference for each category calculated by the user modeling. The musical preference for each category is updated by the above method as the user uses the system.

After the user listens to 10 pieces of music, the directory structure is changed as follows.

The 10 songs selected by the user includes two by HeeEun Yang, two by a duo of TaeChun Jung and EunOk Park and a symphony by Haydn, a symphony by Beethoven, a symphony by Malher, a song by SoLa Lee, an orchestral music by Bach and an andante cantabile by Tschaikowsky. The directory structure changed after the user listens to 10 pieces of music is shown in FIG. 9. The directory structure of FIG. 9 is very similar to that shown in FIG. 8. However, the user preference for each category is changed slightly. As the user continues to use the system the change in user preference to some of categories is shown in FIG. 10.

Figures 10, 11:
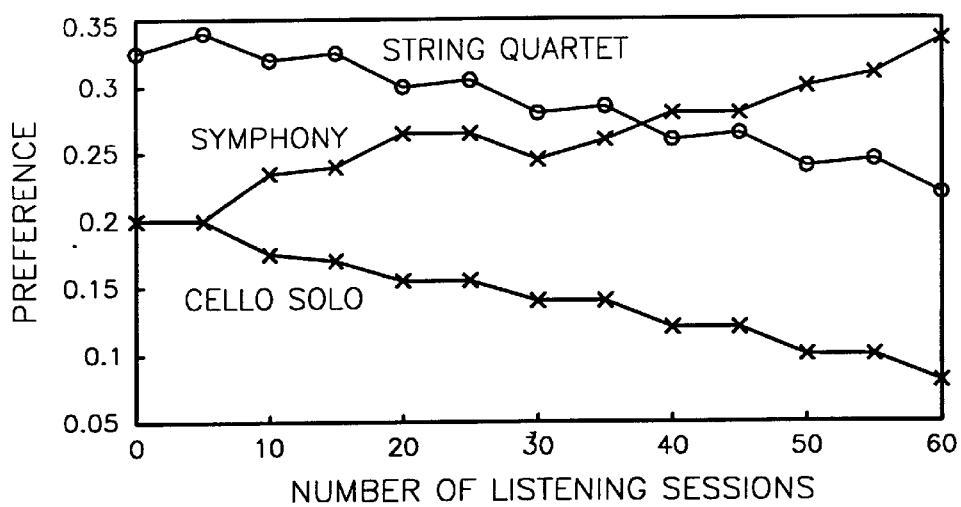
FIG. 10 is a graph illustrating a change in user preference.
FIG. 11 shows the directory structure adapted for the user.

FIG. 10 illustrates how the user preference gradually changes from the general setting given in the initial stage. In the initial setting given to the user, the preference to string quartet and cello solo were initialized to 0.33 and 0.2. However, because the user barely listens those categories, the preference to them gradually decreases by aging methodology. The preference to symphony was initially set to 0.2, however, the preference to symphony gradually increases as the user continues to listen. As the user continues to use the system, a directory structure is adaptively produced as shown in FIG. 11.

Figure 12:
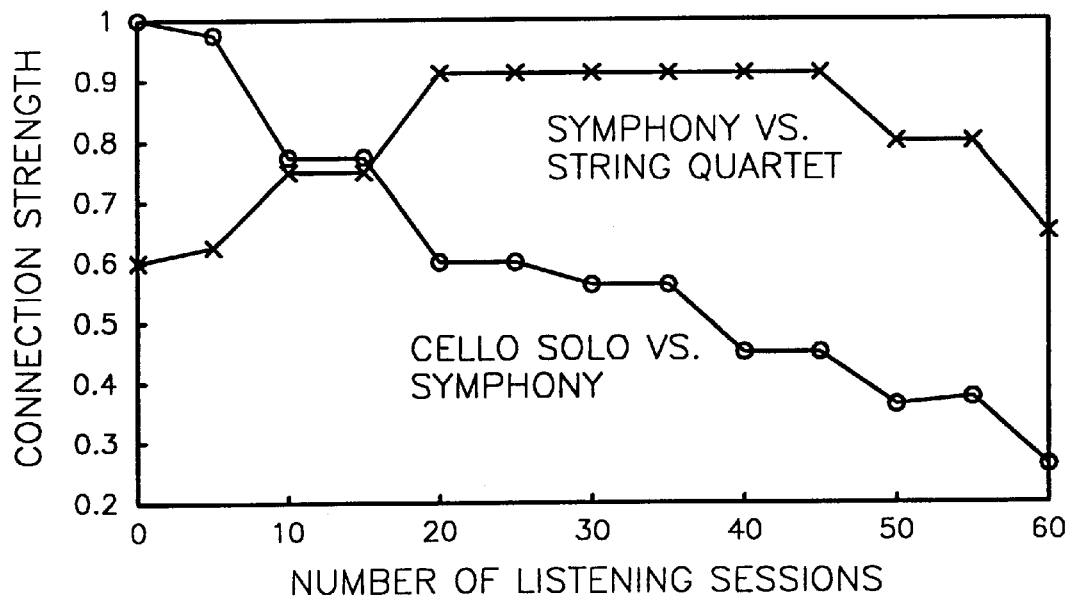
FIG. 12 is a graph showing a change in connection strength among items preferred by the user.

Also, in order to model the user preference the connection strengths among categories are dynamically adjusted to correct and complement the limited information set in the initial stage. Changes in the connection strengths between cello solo and symphony, and between symphony and string quartet, are illustrated in FIG. 12.

Figure 13:
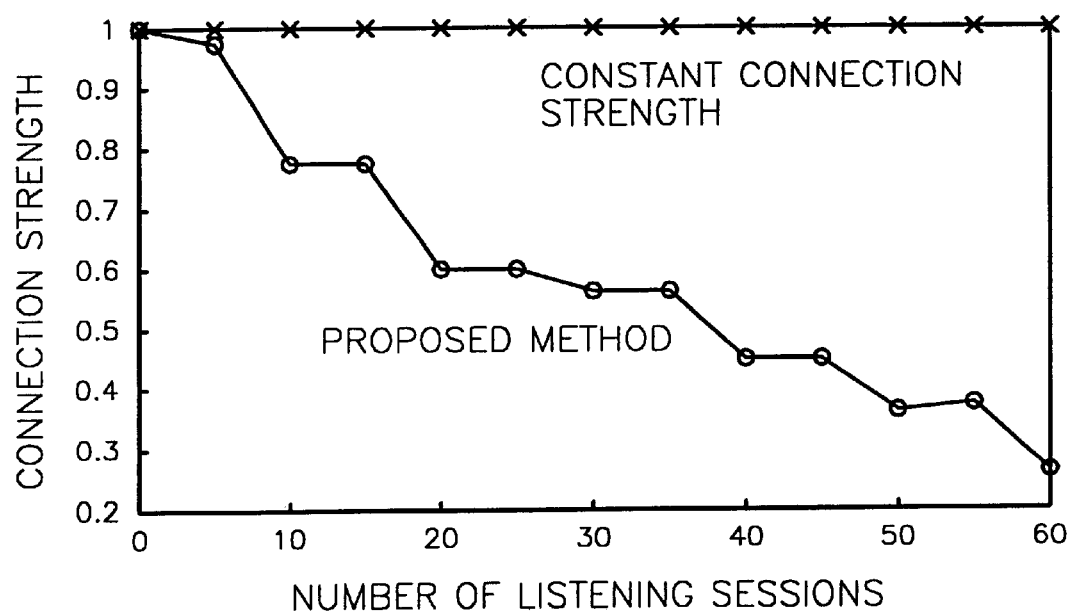
FIG. 13 is a graph showing a change in connection strength between a cello solo and a symphony in the user preference.

Firstly, the connection strength between symphony and string quartet is changed as follows. As shown in FIG. 10, the preference for cello solo which has been initialized to 0.2 gradually decreases as the user uses the system. Also, the preference for symphony which has been initialized to 0.2 gradually increases. Because the preferences for those categories have a close relationship of (0.2, 0.2) in the initial stage, the connection strength between two categories is initialized to 1 as shown in FIG. 12. However, as the preference for the two categories change with time, the connection strength gradually decreases. FIG. 13 comparatively shows a case where the connection strength between cello solo and symphony changes by the proposed method, and the other case where the connection strength between the two categories is kept constant.

Figure 14:
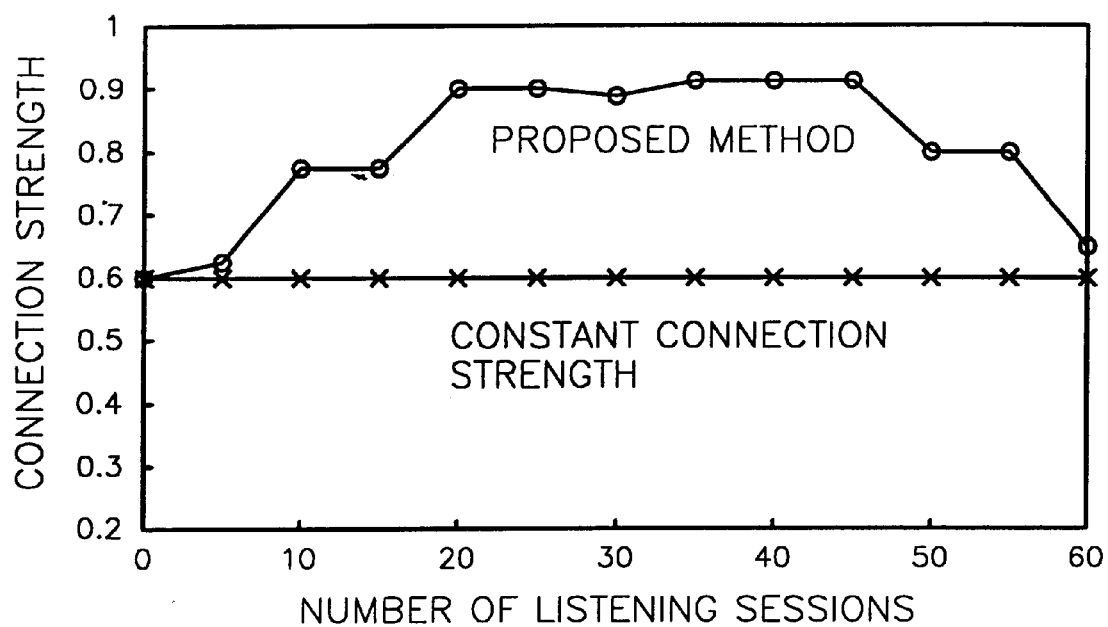
FIG. 14 is a graph showing the connection strength between a symphony and a string quartet in the user preference.

Secondly, connection strength between symphony and string quartet is changed as follows. As shown in FIG. 10, the preference for symphony which has been initialized to 0.2 gradually increases as the user continues to use the system. Also, the preference for string quartet which has been initialized to 0.33 decreases with time. Thus, the connection strength between two categories is initialized to 0.6 based on the initial preference for two categories (0.2, 0.33). However, as the preference for each category changes with time, that is, as the user listens to more symphony than string quartet during 30 listening sessions, the preference for symphony becomes close to that for string quartet. As a result, the connection strength increases gradually. After 30 listening sessions, the preference for ago symphony far exceeds that for string quartet and increases the difference in preference between two categories, thereby lowering their connection strength. FIG. 14 comparatively shows a case where the connection strength between two categories of symphony and string quartet changes by the proposed method and the other case where the connection strength is kept constant.

As described above, it is understood that the connection strengths among each category changes as a user uses the system. For example, even though the connection strength between symphony and cello solo is set to 1 in the initial stage under the assumption that symphony lovers will like cello solo, such assumption would be deemed incorrect as the system is used more frequently by the user. The modeling method according to the present invention can dynamically adjust the setting given in the initial stage depending on the user preference that changes with time.

As described above, the user preference modeling method using fuzzy networks according to the present invention can build up the structure adaptable to the user preference that changes with time, through continuous communications with the user. Also, by the method of adaptively serving a web directory using the fuzzy networks according to the present invention, a web directory structure can be served for users having different preferences.

What is claimed is:

1. A user preference modeling method using fuzzy networks, comprising the steps of:

(a) changing a user modeling structure into a fuzzy network structure in which a plurality of layers including one or more graphs with one or more nodes are stacked;

(b) when information is input from a user, searching a node directly associated with the input information on the fuzzy networks, and calculating a new preference for the node with a predetermined equation;

(c) calculating connection strengths among each node in a graph to which the node belongs according to the new preference obtained in step (b) and calculating a new preference for each node of the graph according to the connection strengths;

(d) when a node of the graph to which the node searched in step (b) belongs is a macro node of a graph of a lower layer, and a node is defined as the macro node if a graph of a lower layer defines sub-regions of the node, transferring a first message as preference change information from the macro node to the graph of the lower layer;

(e) when the graph to which the node searched in step (b) belongs has a macro node in an upper layer, transferring a second message to the macro node as preference change information for all nodes of the graph to which the node belongs;

(f) when a graph receives the first message from a macro node, calculating a new preference for all nodes in the graph that has received the first message, and when a node of the graph that has received the first message is a macro node of a graph of a lower layer, transferring a first message as preference change information to the graph of the lower layer; and (g) when a node receives the second message from a graph of a lower layer, calculating a new preference for the node that has received the second message and performing steps (c) through (e) to other nodes.

2. The method of claim 1, wherein assuming that 1, j and k are positive integers, $F'(m_{ijk})$ represents a new preference for a node $m_{ijk}$ after the preference for the node is changed, $F(m_{ijk})$ represents a preference for the node $m_{ijk}$ before the change, $\text{Diff}(m_{ijk})$ represents the difference in the preference before and after the change, defined as $\text{Diff}(m_{ijk})=F'(m_{ijk})-F(m_{ijk})$, $m_{ijk'}$ represents other nodes in a graph $G_{ij}$ to which the node $m_{ijk}$ belongs and $\alpha$ represents an experimental constant, connection strengths $W(m_{ijk}, m_{ijk'})$ between the node $m_{ijk}$ and the nodes $m_{ijk'}$ are calculated by an equation given by $$W(m_{ijk}, m_{ijk'}) = \alpha \cdot \text{Min}\left\{\frac{F(m_{ijk'})}{F'(m_{ijk})}, \frac{F'(m_{ijk})}{F(m_{ijk'})}\right\}$$

and a new preference $F(m_{ijk'})$ for the nodes $m_{ijk'}$ is calculated by an equation given by $$F'(m_{ijk'})=\text{Min}\{1.0, F(m_{ijk'})+W(m_{ijk}, m_{ijk'})\cdot\text{Diff}(m_{ijk})\}.$$

3. A computer readable medium having embodied thereon a computer program for the user preference modeling using fuzzy networks according to claim 2.

4. The method of claim 1, wherein assuming that 1, j and k are positive integers, $m_{ijk'}$ represents other nodes in a graph $G_{ij}$ to which the node $m_{ijk}$ belongs and $G_{(i+1)j'}$ is the graph at a lower level, the first message of step (d), $G_{msg}(m_{ijk'}, G_{(i+1)j'})$, has information about the difference in preference $\text{Diff}(m_{ijk'})$ before and after the preference for node $m_{ijk'}$ changes, which is expressed as $$G_{msg}(m_{ijk'}, G_{(i+1)j'})=\text{Diff}(m_{ijk'}).$$

5. The method of claim 3, wherein assuming that 1, j, j', k and k' are positive integers, $n(G_{ij})$ represents the total number of nodes in a graph $G_{ij}$ and $F(m_{ijk})$ represents preference for a node $m_{ijk}$, when in step (f) the graph $G_{ij}$ receives a first message $G_{msg}(m_{(i-1)j'k'}, G_{ij})$ from a macro node $m_{(i-1)j'k'}$ of the graph $G_{ij}$, a new preference $F'(m_{ijk})$ for all nodes $m_{ijk}$ belonging to the graph $G_{ij}$ is calculated by an equation given by $$F'(m_{ijk}) = \text{Min}\left\{1.0, F(m_{ijk}) + \frac{1}{n(G_{ij})} \cdot G_{msg}(m_{(i-1)j'k'}, G_{ij})\right\}$$

and when a node $m_{ijk}$ is a macro node of a graph $G_{(i+1)j'}$ of a lower layer, a first message $G_{msg}(m_{ijk}, G_{(i+1)j'})$ is calculated using the difference in preference $\text{Diff}(m_{ijk})$ before and after the change, by an equation given by $$G_{msg}(m_{ijk}, G_{(i+1)j'}) = \text{Diff}(m_{ijk}),$$

and the first message is sent to the graph of $G_{(i+1)j'}$ of the lower layer.

6. A computer readable medium having embodied thereon a computer program for the user preference modeling using fuzzy networks according to claim 5.

7. A computer readable medium having embodied thereon a computer program for the user preference modeling using fuzzy networks according to claim 3.

8. The method of claim 1, wherein assuming that 1, j and k are positive integers, $\text{Diff}(m_{ijk})$ is the difference in preference before and after the preference for a node $m_{ijk}$ is changed, $m_{(i-1)jk'}$ is the macro node to $m_{ijk}$, and $n(G_{ij})$ is the total number of nodes in the graph $G_{ij}$, the second message of step (e), $M_{msg}(G_{ij}, m_{(i-1)j'k'})$, has information about the maximum value in degree of change for all nodes of a graph $G_{ij}$ to which the node $m_{ijk}$ belongs, which is expressed as $$M_{msg}(G_{ij}, m_{(i-1)j'k'}) = \text{Max}\{\text{Diff}(m_{ijl})\}, l=1, \ldots, n(G_{ij}).$$

9. The method of claim 8, wherein assuming that 1, j, j' and k' are positive integers, and $F(m_{ijk})$ represents the current preference for a macro node $m_{ijk}$, when in step (g) the macro node $m_{ijk}$ receives a second message $M_{msg}(G_{(i+1)j'}, m_{ijk})$ from a graph $G_{(i+1)j'}$ of a lower layer, a new preference $F'(m_{ijk})$ of the macro node $m_{ijk}$ is calculated by an equation given by $$F'(m_{ijk}) = \text{Min}\{1.0, F(m_{ijk}) + M_{msg}(G_{(i+1)j'}, m_{ijk})\}.$$

10. A computer readable medium having embodied thereon a computer program for the user preference modeling using fuzzy networks according to claim 9.

11. A computer readable medium having embodied thereon a computer program for the user preference modeling using fuzzy networks according to claim 8.

12. A computer readable medium having embodied thereon a computer program for the user preference modeling using fuzzy networks according to claim 1.

13. A method of serving an adaptive web directory using fuzzy networks, comprising the steps of:

(a) changing a web directory structure on a web server into a fuzzy network structure in which a plurality of layers including one or more graphs with one or more nodes are stacked;

(b) when information is input by a user, searching a node on the fuzzy networks, the node being directly associated with the input information, and calculating a new preference for the node;

(c) calculating connection strengths for all nodes of a graph to which the node searched in step (b) belongs, based on the new preference obtained in step (b), and calculating new preferences for each node of the graph in consideration of connection strengths;

(d) when a node of the graph to which the node searched in step (b) belongs is a macro node of a graph of a lower layer, wherein a node is defined as the macro node if a graph of a lower layer defines sub-regions of the node, transferring a first message as preference change information from the macro node to the graph of the lower layer;

(e) when the graph to which the node searched in step (b) belongs has a macro node in an upper layer, transferring a second message to the macro node as preference change information for all nodes of the graph to which the node belongs;

(f) when a graph receives the first message from a macro node, calculating a new preference for all nodes in the graph that has received the first message, and when a node of the graph that has received the first message is a macro node of a graph of a lower layer, transferring a first message as preference change information to the graph of the lower layer;

(g) when a node receives the second message from a graph of a lower layer, calculating a new preference for the node that has received the second message and performing steps (c) through (e) to other nodes; and (h) restructuring the web directory according to the user preference to provide a web directory structure adaptable to the user preference characteristic.

14. A computer readable medium having embodied thereon a computer program for the adaptive web directory service using fuzzy networks according to claim 10.

* * * * *